United States Patent

[11] 3,591,307

| | | |
|---|---|---|
| [72] | Inventor | Arthur L. Barnard<br>Royal Oak, Mich. |
| [21] | Appl. No. | 829,962 |
| [22] | Filed | June 3, 1969 |
| [45] | Patented | July 6, 1971 |
| [73] | Assignee | Ex-Cell-O Corporation<br>Detroit, Mich. |

[54] DRILL JIG BUSHING LOCKING PLATE
8 Claims, 9 Drawing Figs.

[52] U.S. Cl. .................................................. 408/241
[51] Int. Cl. ................................................. B23b 49/02
[50] Field of Search .......................................... 77/62 B

[56] References Cited
UNITED STATES PATENTS
2,558,814  7/1951  Briney .................... 77/62 B OTHER REFERENCES
AMERICAN MACHINIST, Vol. 54, No. 23, Page 997, June 9, 1921, Fig. 63E and F and Page 998, copy available in Group 320, class 77 subclass 62 (B)

*Primary Examiner*—Francis S. Husar
*Attorney*—Frank B. Hill

ABSTRACT: This disclosure relates to a locking plate which can be utilized with a slip replaceable drill jig bushing and turn it into a fixed replaceable drill jig bushing by placing a lock plate around the lock screw to act in conjunction with a bayonet-type release system of the slip replaceable drill jig bushing.

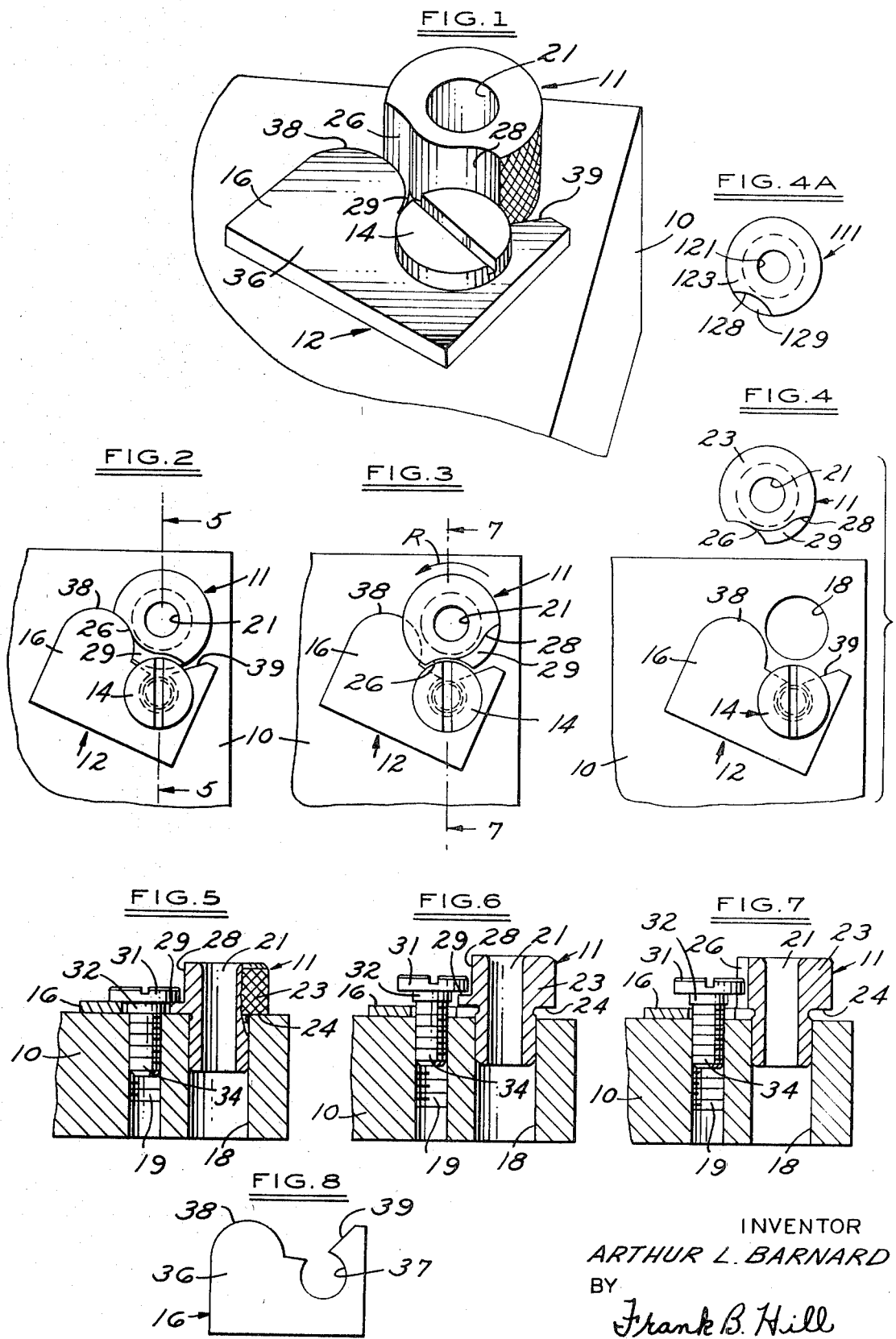

DRILL JIG BUSHING LOCKING PLATE

The present invention relates to the locking system for drill jig bushings and more particularly to a lock plate utilized in conjunction with a lock screw which can easily convert a slip replaceable drill jig bushing into a fixed replaceable drill jig bushing.

In the drill jig bushing field there are various size drill jig bushings that are utilized to fulfill specific functions for the drilling industry. Through these range of sizes there are two series that have also become standard in the industry. One of the series is slip replaceable drill jig bushings and another series is fixed replaceable drill jig bushings. This arrangement, of course, calls for multiple inventories to fulfill substantially the same industrial need and also requires separate classification numbers to assure that the proper style or series of either the fixed or the slip replaceable drill jig bushing is supplied to the customer for a particular order. As a consequence, there is the additional cost of double stocking of drill jig bushings, the double separation and manufacturing steps, along with the necessary step of providing different part numbers for the two systems, and the necessary steps to insure that erroneous shipments are not made by the manufacturer of the wrong drill jig bushings to the ultimate customer or user.

It is, therefore, one of the objects of the present invention to provide an intermediate lock means to be utilized in conjunction with the lock screw to give a slip replaceable drill jig the characteristics of a fixed replaceable jig and permit it to be utilized in the same structure as a normal bushing would be replaced in a jig or fixture.

A further object of the present invention is to provide a lock plate which can be utilized in application on presently available equipment to permit a slip replaceable drill jig bushing to be utilized in a fixed replaceable drill jig bushing.

Another objective of the present invention is to provide a drill jig bushing locking system which includes a locking plate and is capable of accomplishing these objectives with a minimal of material and fabricating cost, while providing reliable and rugged locking system.

Other objectives and advantages of the present invention will become apparent from the following detailed description and from the claims when considered in conjunction with the annexed drawings:

FIG. 1 is a prospective view of a jig or fixture having a slip replaceable drill jig bushing locked in position and illustrating the principles of the present invention. FIG. 2 is a top plan view illustrating the jig or fixture with the drill jig bushing locked in position as illustrated in FIG. 1.

FIG. 3 illustrates a drill jig bushing turned from the position shown in FIG. 2 into a position it can be removed from the jig or fixture and illustrating the principles of the present invention.

FIG. 4 is a top plan view of the locking system of the drill jig bushing and the top head of a slip replaceable drill jig bushing similar to those illustrated in FIGS. 1, 2, and 3.

FIG. 4A is a top plan view of a drill jig bushing head illustrating a fixed replaceable drill jig bushing.

FIG. 5 is a partial cross-sectional view of a jig or fixture illustrating a slip replaceable drill jig bushing locked in position and taken substantially along line 5-5 of FIG. 2.

FIG. 6 is a partial cross-sectional view similar to FIG. 5 of a drill jig bushing after the lock screw has been released enough from its locked position to permit the drill jig bushing to be raised prior to turning to removal position.

FIG. 7 is a partial cross-sectional view of a jig or fixture and the drill jig bushing similar to FIGS. 2 and 3 after the drill jig bushing has been turned to its removal position shown in FIG. 3 and is taken substantially along line 7-7 of FIG. 3.

FIG. 8 is a top plan view of the lock plate and illustrates principles of the present invention and the plate is similar to the lock plate illustrated in FIG. 1 through 7.

Referring to the drawings, FIG. 1 shows a portion of a jig or fixture generally indicated by numeral 10. A drill jig bushing 11 is positioned in the jig 10 and held by a locking system generally indicated by numeral 12. The locking system 12 is provided with a lock screw 14 and a lock plate 16. The fixture 10 has a bushing opening 18 to receive the drill jig bushing 11 and a threaded hole 19 to receive the lock screw 14 as best viewed in FIGS. 4 through 7. The drill jig bushing 11 has a positioning hole 21 which extends its complete length and locates a machining tool during its machining operation. The machine tool is not illustrated in the drawings but is well known in the machining art. A head member 23 is part of the drill jig bushing 11 and is provided with a flange surface 24 which locates the head member 23 on the surface of the fixture 10. The head member 23 is provided at the upper end of the drill jig bushing 11 and is provided with a bayonet lock system which is well known in the art as a slip replaceable drill jig bushing. The bayonet lock system has a concave surface 26, as best illustrated in FIG. 4, and an extended surface 28 which works in conjunction with a head receiving shelf 29 the full function of which will be explained in more detail below.

The lock screw 14 has a head 31, a shoulder surface 32, and a threaded end 34 which is turned into the threaded hole 19 of the jig 10. The locking plate 16 has a body member 36 which is provided with an opening 37. The opening 37 receives the threaded end 34 and the shoulder surface 32 of the locking screw 14. The opening 37 does not form a complete circle, but is provided with a gap on part of its circumference which is not large enough to permit the locking plate to slip away from the lock screw 14. A convex surface generally referred to by numeral 38 is provided and works in conjunction with the concave surface 26 of the drill jig bushing 11 as will be explained in more detail below. A contact surface 39 is provided and is positioned at such an angle that it is substantially tangential to the outside surface of the head member 23. This relationship between the convex surface 38 and the contact surface 39 causes the drill jig bushing 11 to be radially locked into position in the bushing opening 18. The locking plate 16 is placed in position to have the convex surface 38 contact the concave surface 26 and the contact surface 39 will act as a wedging element to holding the head member 23 in position when the locking screw is turned into the threaded hole 19 securing it in place. This would give us a construction similar to that illustrated in 1 and 5 for example.

The drill jig bushing's head member 23 is the style which conforms to the specifications established by the American Standards Association, known as A.S.A., as a slip replaceable drill jig bushing. Using the slip replaceable drill jig bushing 11 in conjunction with the locking plate 16, it now takes on the characteristics of a fixed replaceable drill jig bushing. The major difference between a slip replaceable drill jig bushing and a fixed replaceable drill jig bushing is that the fixed replaceable drill jig bushing only has a surface to receive the head of a locking screw. The locking screws must be completely removed before the fixed replaceable drill jig bushing can be taken out of position in a jig or fixture. A typical fixed replaceable drill jig bushing 111 is illustrated in FIG. 4A. The drill jig bushing 111 has a head member 123, a positioning hole 121, and a concave surface 128 which works in conjunction with a lock screw head receiving shelf 129. In the present invention when the drill jig bushing 11 is to be replaced, the lock screw 14 can be completely removed and the drill jig bushing 11 can be lifted out and replaced. Also, to give a more universal and advantageous system the lock screw could be released just enough so that the drill jig bushing 11 can be raised so that the flange surface 24 could be raised just above the body member 36 of the lock plate 16 as illustrated in FIG. 6. At that time the drill jig bushing 11 can be rotated in a counterclockwise direction as indicated by arrow R as illustrated in FIG. 3. Then a used drill jig bushing 11 can be lifted out of position and a new drill jig bushing can be replaced in a reverse manner.

This provides a system giving the operator and user substantial latitude in both types of bushing use and application. For example, the lock screw 14 is so arranged in position with the bushing opening 18 that a fixed replaceable drill jig bushing 111 as illustrated in FIG. 4A could be utilized, if desired. A slip replaceable drill jig bushing 11 could be utilized without a lock plate 16 and having the normal characteristics of a slip replaceable drill jig bushing or the lock plate 16 could be utilized with a slip replaceable drill jig bushing giving it the characteristics of a fixed replaceable drill jig bushing as explained above. Also the advantages of a slip replaceable drill jig bushing in replacement can be retained with the lock plate 16 when replacement is desired. While the invention is susceptible to various modifications and alternative constructions, certain illustrative locking means have been shown in the drawings and described above in detail, it should be understood, however, that there is no intention to limit the invention to the specific forms disclosed. On the contrary, the intention is to cover all modifications, alternative constructions, embodiments, and uses within the spirit and scope of the invention as expressed in this disclosure.

Other modes of applying the principles of our invention may be employed instead of those explained, change being made as regards the article and combinations herein disclosed, provided the features stated be any of the following claims or the equivalent of such stated features be employed. I, therefore, particularly point out and distinctively claimed as my invention:

1. A drill jig bushing locking system comprising in combination:
   a. a jig member having a bushing opening;
   b. a drill jig bushing positioned in said bushing opening;
   c. a threaded receiving hole in said jig member and positioned a predetermined distance from said bushing opening;
   d. a lock screw located in said threaded receiving hole;
   e. a lock means positioned between said lock screw and said drill jig bushing to hold said drill jig bushing in a substantially fixed radial position;
   f. said lock screw to hold said drill jig bushing in a substantially fixed axial position;
   g. a rounded head member as part of said drill jig bushing;
   h. a flange surface as part of said head member and acting on said jig members surface;
   i. a concaved surface on said head member permitting said drill jig bushing to be moved past said lock screw when in said bushing opening;
   j. an extended surface on said head member having a head receiving shelf formed with part of said flange surface;
   k. said receiving shelf is positioned under said locking screw when said drill jig bushing is in locking position; and
   l. said lock means having a first lock member to act with said concave surface on one side of said lock screw and said head member and a second lock member to act with said head member on the other side of said lock screw and said head member.

2. A drill jig bushing locking system as defined in claim 1, having:
   a. said first locking member having a convexed surface to act with said concave surface.

3. A drill jig bushing locking system as defined in claim 1, having:
   a. said second locking member having a substantially straight contact surface which is substantially tangential to the surface of said head member.

4. A drill jig bushing system as defined in claim 1, having:
   a. an opening positioned through said locking means between said first and second lock members, to permit said locking screw to locate it in locking position.

5. A drill jig bushing system as defined in claim 1, having:
   a. said head receiving shelf at least as thick as said locking means.

6. A drill jig bushing locking system as defined in claim 2, having:
   a. said second locking member having a substantially straight contact surface which is substantially tangential to the surface of said head member.

7. A drill jig bushing system as defined in claim 6, having:
   a. an opening positioned through said locking means between said first and second lock members, to permit said locking screw to locate it in locking position.

8. A drill jig bushing system as defined in claim 7, having:
   a. said head receiving shelf at least as thick as said locking means.